United States Patent [19]

Judd

[11] 4,410,350
[45] Oct. 18, 1983

[54] PRODUCTION OF PELLETS AND PELLET-CONTAINING FERTILIZER COMPOSITION

[75] Inventor: George G. Judd, Woodville, Ohio

[73] Assignee: Martin Marietta Corporation, Bethesda, Md.

[21] Appl. No.: 359,236

[22] Filed: Mar. 18, 1982

Related U.S. Application Data

[63] Continuation-in-part of Ser. No. 135,008, Mar. 31, 1980, abandoned.

[51] Int. Cl.³ ............................................. C05D 11/00
[52] U.S. Cl. ...................................... 71/63; 71/64.01; 71/64.12; 427/212
[58] Field of Search ................ 71/1, 31, 62, 63, 64.01, 71/64.12; 427/180, 201, 212, 215, 343

[56] References Cited

U.S. PATENT DOCUMENTS 4,013,442  3/1977  Kawar .............................. 71/64.12

OTHER PUBLICATIONS

"Disposal and Utilization of Waste Kiln Dust from Cement Industry," Davis et al., 5/75, pp. 31-37, 48-54.

*Primary Examiner*—Ferris H. Lander
*Attorney, Agent, or Firm*—Herbert W. Mylius

[57] ABSTRACT

A composition comprising an agricultural fertilizer and pellets is disclosed. The fertilizer and the pellets are predominantly in the minus six plus thirty mesh size. The pellets consist essentially of at least one hydroxide, oxide or carbonate of calcium, magnesium or both, and constitute from 5 to 90 percent by weight of the composition. The pellets contain at least 2 percent by weight of calcium, magnesium or both in the form of the oxide, the hydroxide or both, calculated as the oxide.

4 Claims, No Drawings

4,410,350

PRODUCTION OF PELLETS AND PELLET-CONTAINING FERTILIZER COMPOSITION

REFERENCE TO RELATED APPLICATION

This is a continuation-in-part of application Ser. No. 135,008, filed Mar. 31, 1980, now abandoned.

BACKGROUND OF THE INVENTION

Fertilizers are conventionally formulated from active fertilizing ingredients and at least one filler. Fertilizers can be organic in nature, for example residue from sewage treatment plants, in which case the filler is usually organic, for example ground corn cobs, soybean oil meal or corn oil meal, or can be inorganic in nature and, in that instance, usually mixed with at least one inorganic filler. Inorganic fertilizers are usually blends of such materials as potassium chloride, diammonium phosphate, ammonium nitrate, super phosphates and urea in such proportions that they provide the relative amounts of nitrogen, phosphorus and potassium desired; the proportion of filler employed is that which gives the desired level of active fertilizer ingredients. Silica, limestone, dolomite and manufactured pellets have all been suggested as fillers for use with inorganic fertilizers. For example, U.S. Pat. No. 4,015,973, Perrine, suggests a method for producing the pellets from limestone, dolomite or marl and sodium bentonite, as well as compositions which are mixtures of fertilizers with the pellets. So far as is known, however, no previously suggested fertilizer composition has included a filler which materially reduces the tendency of the active fertilizer ingredients to cake with standing under more or less humid conditions.

THE PRESENT INVENTION

The subject invention is based upon the discovery of a method for producing pellets from fine particulate material such as dust collected from dolomitic or calcitic lime kilns and to compositions which are a blend of the pellets so produced with active fertilizer ingredients. The method involves mixing the kiln dust or the like with sufficient water to hydrate calcium and magnesium oxides therein and to provide a mixture containing from 6 to 15 percent* of water, based upon the sum of water and dust, pelletizing the resulting mixture and treating the pellets with carbon dioxide gas to form a pervious carbonate surface layer thereon and to dry the pellets. Instead of dust from a dolomitic or calcitic lime kiln, any other fine particulate material can be pelletized by the method of the present invention provided that that material consists essentially of at least one hydroxide, oxide or carbonate of calcium, magnesium or both, so long as not more than 98 percent of the particulate material is the carbonate.

*The terms "percent" and "parts" are used herein, and in the appended claims, to refer to percent and parts by weight, unless otherwise indicated.

OBJECTS OF THE INVENTION

It is an object of the invention to provide a method for producing improved pellets from a fine particulate material containing at least one hydroxide, oxide or carbonate of calcium, magnesium or both.

It is a further object of the invention to provide a fertilizer composition comprising an agricultural fertilizer and pellets of at least one hydroxide, oxide or carbonate of calcium, magnesium or both.

Other objects and advantages will be apparent from the description which follows, which is intended only to illustrate and disclose, and in no way to limit, the invention.

DESCRIPTION OF PREFERRED EMBODIMENTS

The following Example constitutes the best mode presently known to the inventor for practicing the instant invention.

EXAMPLE

Dust collected from the gaseous effluent from a dolomitic lime kiln and water were fed continuously to a disk pelletizer. The dust had an average composition of 38.38 percent CaO and 28.01 percent MgO, both on an oxide basis, and had a sulfur content of 0.676 percent and a loss on ignition of 31.62 percent; it was fed to the disk pelletizer at a rate of about 8,335 pounds per hour. The calcium and magnesium compounds actually present in the dust were not determined quantitatively, but were found to include the oxides, hydroxides, sulfates and carbonates. Water was charged to the disk pelletizer at a controlled rate sufficient to hydrate the calcium and magnesium oxides in the dust and to provide a free water content of substantially 12 percent. The disk pelletizer had an interior disk which was rotated at about 20 revolutions per minute in a plane inclined about 60° to the horizontal. The disk was circular, having a diameter of about 72 inches, and had raised edges extending upwardly substantially 8 inches. The kiln dust and water were projected downwardly onto the disk; pellets which formed as a consequence of the rotation of the disk collected between the lower side of the disk and the upwardly extending wall and flowed over the wall for discharge from the pelletizer. Pellets discharged from the pelletizer were transferred to a dryer through which flue gas containing about 18 percent by volume of carbon dioxide was circulated at a rate of substantially fifty tons per hour, temperature approximately 680° F., contact with the pellets. The dryer reached a steady condition at which flue gas and pellets were discharged therefrom at a temperature of approximately 260° F. as a consequence of the exothermic heat of reaction between carbon dioxide on the one hand and magnesium hydroxide and calcium hydroxide on the other. Pellets discharged from the dryer after an average residence time of about thirty minutes were placed on a two-stage vibrating screen having an upper six mesh screen and a lower thirty mesh screen. Pellets which passed through the upper six mesh screen and remained on the lower thirty mesh screen were removed from the system as the final product. Pellets which remained on the upper six mesh screen were transferred to a crusher; the effluent from the crusher was returned to the upper six mesh screen. Undersized material which passed through both the upper six mesh screen and the lower thirty mesh screen was returned to the disk pelletizer for recycling. Pellets produced as just described were found to have a hard, pervious outer skin of calcium and magnesium carbonates; as a consequence of this skin they were hard and resistant to crushing.

A 14-7-7 (nitrogen-phosphorus-potassium) fertilizer was produced in a ribbon-type blender from 305 pounds of diamonium phosphate, 1074 pounds of ammonium sulfate, 226 pounds of potash and 395 pounds of pellets produced as described in the preceding paragraph hereof. The foregoing ingredients were merely charged to the ribbon blender and mixed to uniformity. The resulting fertilizer was found to be unexpectedly advantageous for two reasons: it was substantially dust-free when applied to soil and was highly resistant to caking upon standing, even for prolonged periods of time under conditions of high humidity.

A 10-10-10 fertilizer was also prepared from 435 pounds of diammonium phosphate, 580 pounds of ammonium sulfate, 323 pounds of potash and 662 pounds of the same pellets. The fertilizer was also produced by blending to uniformity in a ribbon-type blender; the final product was found to have the same advantages.

It will be appreciated that an unexpectedly advantageous composition is provided according to the present invention. The composition comprises an agricultural fertilizer and pellets which consist essentially of at least one hydroxide, oxide or carbonate of calcium, magnesium or both. The pellets preferably constitute from 5 to 90 percent of the composition and contain at least 2 percent of calcium, magnesium or both in the form of the oxide, the hydroxide or both, calculated as the oxide. Desirably, the pellets constitute from 20 to 60 percent of the composition and, most desirably, from 25 to 50 percent thereof. The hard, pervious surface carbonate layer on the pellets increases their strength and reduces dusting when the composition is applied to soil. In the procedure described in the foregoing Example this layer was formed in the dryer by reaction between carbon dioxide from the flue gas passed therethrough and the previously formed pellets. The availability of calcium or magnesium oxide or hydroxide to undergo this reaction is essential in producing pellets according to the invention; consequently, not more than 98 percent by weight of the particulate material from which the pellets are formed can be the carbonate or, conversely, at least 2 percent thereof must be calcium, magnesium or both in the form of the oxide or hydroxide. Preferably, not more than about 80 percent of the particulate material pelletized is in the form of carbonate and, most desirably, not more than about 50 percent thereof.

The use of flue gas for reaction with the pellets in the dryer to form the pervious carbonate surface layer is preferred whenever such gas is available as what would otherwise be a waste stream. However, the use of pure carbon dioxide gas or a mixture of air or other gas with carbon dioxide is equally operable. Since the reaction between carbon dioxide on the one hand and calcium or magnesium oxide or hydroxide on the other hand is ionic, and occurs substantially instantaneously, only a short period of time and even at a comparatively low carbon dioxide concentration is necessary. For example, a hard carbonate surface layer can be formed in as little as ten minutes in an atmosphere containing as little as 5 percent of carbon dioxide. However, it is not essential to limit reaction time because formation of the carbonate surface layer reduces the opportunity for contact between carbon dioxide and additional oxides or hydroxides of calcium or magnesium, so that reaction rate diminishes with increases in reaction time, and the reaction is, for all practical purposes, one which stops itself. Accordingly, there is no practical upper limit on the time that can be allowed for reaction and drying. However, no benefit is derived from extended reaction times, and unnecessarily large apparatus is required if they are used. Ordinarily, optimum results are achieved by using times for reaction between carbon dioxide and the pellets ranging from about 15 minutes to about 1 hour, and allowing exothermic heat of the carbonation to raise the pellets to a temperature of at least about 215° F. so that drying also occurs during reaction.

While the instant invention is not to be limited thereto or thereby, the following theory is offered by way of further illustration and disclosure. The pellets produced by the method described in the foregoing Example were made from dust collected from the gaseous effluent from a dolomitic lime kiln. The dust contained, on the average, 38.38 percent of CaO and 28.01 percent of MgO, on an oxide basis, present as compounds including the oxides, hydroxides, sulfates and carbonates. Both calcium oxide and magnesium oxide react with water, forming the hydroxides. In addition, magnesium carbonate ($MgCO_3$) reacts with water, forming nesquehonite ($MgCO_3.3H_2O$). The high order of resistance to caking of fertilizers produced as described above, and containing pellets produced as described in the foregoing Example, is believed to indicate that the pellets desiccate the fertilizer by reacting preferentially with water and, as a consequence, prevent hydration of the fertilizer which would otherwise cause caking.

It will be appreciated that the fertilizer produced as described above from such fertilizer ingredients as ammonium sulfate, potash, and diammonium phosphate and pellets produced as described in the foregoing Example are physical mixtures of the pellets with the fertilizer ingredients. They differ in this respect from the fertilizers suggested by such prior art as Davis et al., "Disposal and Utilization of Waste Kiln Dust From Cement Industry", pp. 31-37, 48-54 (cited against the parent hereof) and U.S. Pat. No. 4,013,442 to Kawar. The Davis et al. reference suggests fertilizer compositions made from cement kiln dust plus phosphorus and nitrogen compounds, and that such fertilizer compositions are capable of being granulated to reduce dusting when applied to soil. Kawar suggests the coating of particles composed of or containing active fertilizers with a metal hydroxide or oxide, and carbonating to convert the hydroxide or oxide to a carbonate. In each of these compositions suggested by the prior art there is only one kind of pellet, not the physical mixture of pellets with fertilizer ingredients produced as described above.

While dust from a dolomitic lime kiln constituted the particulate material from which pellets were made by the procedure described in the foregoing Example, it will be appreciated that dust from a calcitic lime kiln can equally well be used, as can particulate compositions produced by blending calcium oxide or hydroxide, magnesium oxide or hydroxide or both with ground limestone, ground dolomite or other inert materials, e.g. silica. Indeed, pellets can be produced according to the present invention from calcium oxide or hydroxide and from magnesium oxide or hydroxide, if desired.

Various other changes and modifications from the invention as described in the foregoing Example can also be made without departing from the spirit and scope thereof as defined in the appended claims.

What I claim is:

1. A composition comprising a physical mixture of an agricultural fertilizer and pellets, said fertilizer being predominantly in the minus six plus thirty mesh size and said pellets being predominantly minus six plus thirty mesh in size and consisting essentially of at least one hydroxide, oxide or carbonate of calcium, magnesium or both, said pellets constituting from 5 to 90 percent by weight of the composition, and containing at least 2 percent by weight of calcium, magnesium or both in the form of the oxide, the hydroxide or both, calculated as the oxide whereby said physical mixture exhibits a comparatively high order of resistance to caking by comparison with the resistance to caking of the fertilizer therein.

2. A composition as claimed in claim 1 wherein said pellets constitute from 20 to 60 percent by weight of the composition.

3. A composition as claimed in claim 1 wherein said pellets constitute from 25 to 50 percent by weight of the composition.

4. A composition as claimed in claim 3 wherein said pellets have a hard, pervious surface carbonate layer which increases their strength and reduces dusting when the composition is applied to soil.

* * * * *